Jan. 3, 1956  R. H. DICKENSHIED ET AL  2,729,500
LOCKING MEANS FOR LICENSE PLATE ACCESSORY
FOR GUARDING FUEL TANK FILLER TUBES
Filed Jan. 23, 1952  2 Sheets-Sheet 1

C. F. DICKASON
R. H. DICKENSHIED
INVENTOR.

BY  E. C. McRae
    J. R. Faulkner
    J. H. Oster
         ATTORNEYS

Jan. 3, 1956   R. H. DICKENSHIED ET AL   2,729,500
LOCKING MEANS FOR LICENSE PLATE ACCESSORY
FOR GUARDING FUEL TANK FILLER TUBES
Filed Jan. 23, 1952   2 Sheets-Sheet 2

C.F.DICKASON
R.H.DICKENSHIED
INVENTOR.

BY E. C. McRae
J. R. Faulkner
J. H. Oster

ATTORNEYS

United States Patent Office 2,729,500
Patented Jan. 3, 1956

2,729,500

LOCKING MEANS FOR LICENSE PLATE ACCESSORY FOR GUARDING FUEL TANK FILLER TUBES

Richard H. Dickenshied, Birmingham, and Carl F. Dickason, Ann Arbor, Mich., assignors to Ford Motor Company, Dearborn, Mich., a corporation of Delaware Application January 23, 1952, Serial No. 267,882

1 Claim. (Cl. 296—28)

This invention relates generally to a vehicle body construction, and has particular reference to a fuel tank guard for preventing unauthorized access to the fuel tank filler tube.

The present invention is particularly applicable to a construction of the type shown in Patent Number 2,708,594 dated May 17, 1955. In that construction the fuel tank is located centrally of the vehicle and the filler tube extends obliquely through the stationary lower back panel of the body in a central location transversely of the vehicle. The end of the filler tube and the cap are normally concealed from view by means of a pivoted bracket spring held against the back panel and carrying means for supporting a license plate thereon. In its normal position the bracket conceals the filler tube from view yet it can be readily swung downwardly to provide access to the filler tube for filling purposes. The present invention constitutes an improvement of and/or an accessory for this construction, and provides relatively inexpensive means for guarding the fuel tank filler tube and preventing unauthorized access thereto, eliminating the possibility of fuel theft.

It is a further object of the invention to provide a fuel tank guard or cover unit of the type discussed above which may be incorporated in new vehicle construction during production, or which may be readily added to existing vehicles as an accessory. Still another object is to eliminate the necessity for providing separate key-operated lock means for a guard or cover unit of this type and to arrange the cover unit for cooperation with the luggage compartment lid so that the lock means of the latter may be utilized to also lock the cover unit or guard construction. The arrangement is such that the luggage compartment lid must be opened a slight amount in order to permit the fuel tank cover unit to be swung downwardly to provide access to the filler tube.

Other objects and advantages will appear as the description proceeds. The drawings are as follows.

Figure 1:
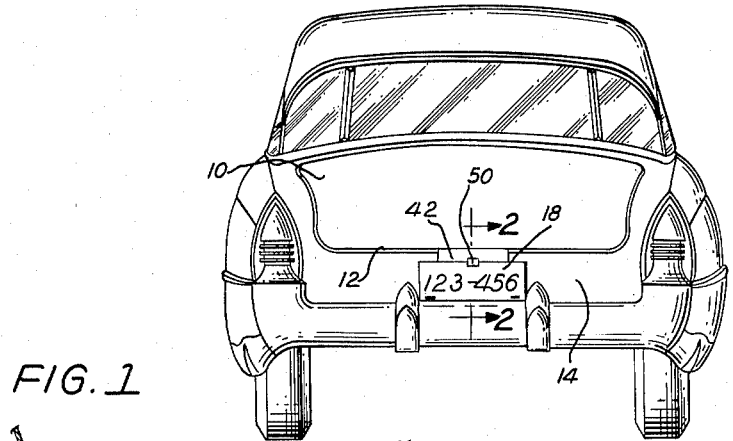
Figure 1 is a rear elevational view of a motor vehicle body incorporating the construction of the present invention.

Referring now to the drawings, Figure 1 shows a motor vehicle passenger car body having a luggage compartment closed by a luggage compartment lid 10 pivotally connected at its forward edge to the vehicle body. Beneath the lower and rearward marginal edge 12 of the lid is a fixed lower body panel 14. Pivotally mounted upon the back panel 14 is a guard or cover 16 supporting a license plate 18 and concealing the fuel tank filler tube located beneath the unit, yet enabling the filler tube to be readily accessible by swinging the unit downwardly and rearwardly.

Figures 2, 3:
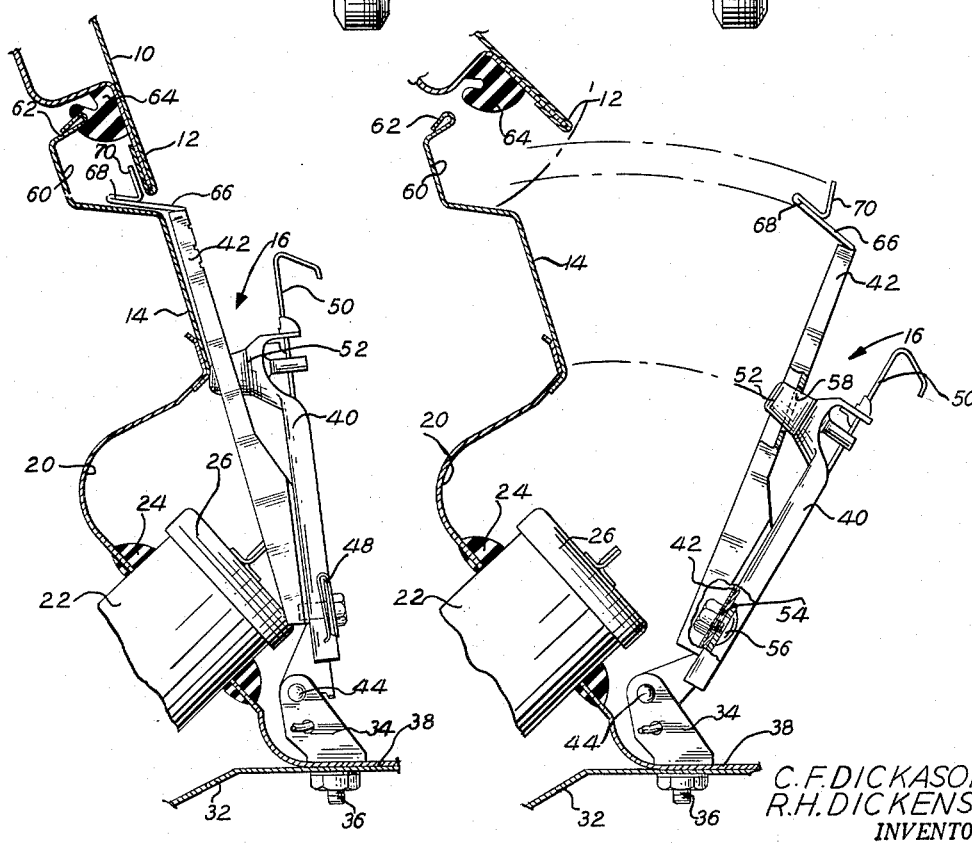
Figure 2 is an enlarged cross-sectional view taken on the plane indicated by the line 2—2 of Figure 1.
Figure 3 is a cross-sectional view similar to Figure 2 but showing the fuel tank guard or cover unit partially opened.
Figure 4:
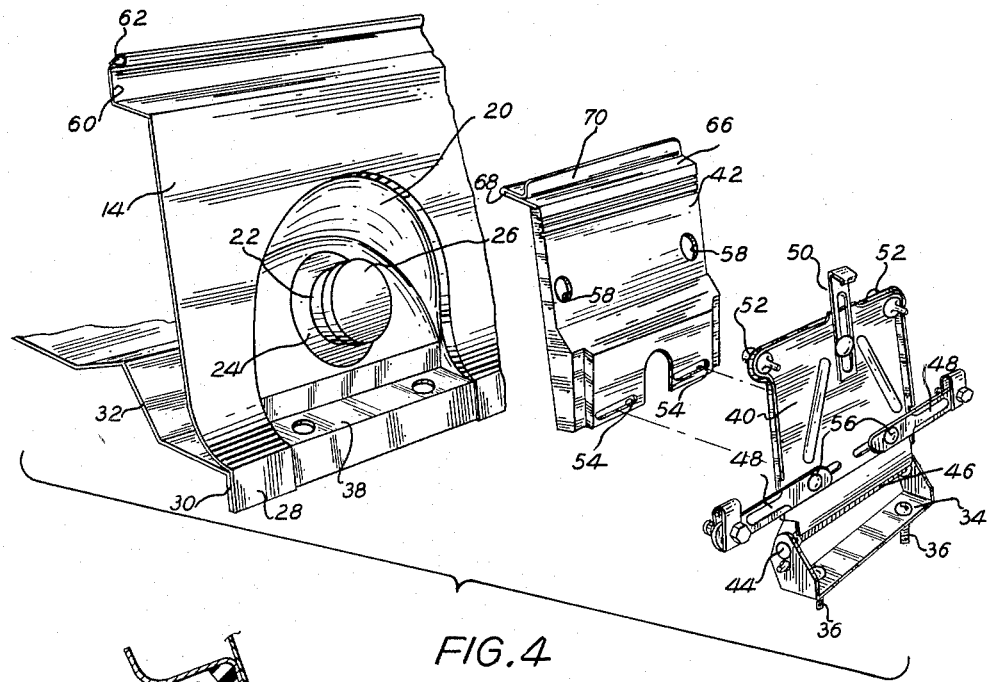
Figure 4 is an exploded perspective view of the construction shown in the preceding views.

As best seen in Figures 2 and 4, the central portion of the back panel 14 is formed with a depression 20 into which the upper end of the fuel tank filler tube 22 extends. The opening through the depressed portion 20 of the panel is sealed by means of a rubber grommet 24, and the end of the filler tube is provided with a conventional removable cap 26. The lower portion of the back panel 14 is formed with a downwardly extending marginal flange 28 (Figure 4), suitably welded to a corresponding flange 30 of the generally horizontal floor panel 32 of the luggage compartment. A conventional fuel tank (not shown) is supported beneath the floor panel 32 and is suitably connected to the filler tube 22.

A U-shaped supporting bracket 34 is connected by means of bolts 36 to the horizontal portion 38 of the depressed portion 20 of the back panel, and pivotally supports the cover unit 16. The cover unit in the embodiment of the invention shown in Figures 1 to 4 comprises a bracket 40 and a cover plate 42. The bracket 40 is pivotally connected at its lower edge to the supporting bracket 34 by means of a pivot pin 44 and is normally urged toward the vehicle back panel by means of a coil spring 46 surrounding the pin 44. The bracket 40 carries a pair of transversely adjustable lugs 48 and a vertically adjustable lug 50 having means thereon for supporting a license plate in the conventional manner. Rubber bumpers 52 are mounted in the upper corners of the bracket 40 and bear against the back panel 14 to cushion the engagement therebetween. It will be apparent that the bracket 40 and the license plate carried thereby normally cover the depressed portion 20 of the back panel 14 and the filler tube end, but may be swung downwardly against the action of coil spring 46 to provide access to the filler tube for filling purposes.

The cover plate 42 is best shown in Figure 4 and comprises a plate-like stamping having elongated slots 54 along its lower edge for receiving the bolts 56 which extend through the license plate lugs 48 and the bracket 40. Holes 58 are provided in the cover plate 42 through which the rubber bumpers 52 extend. It will be seen that the bolts 56 clamp the cover plate 42 to the bracket 40 and that the rubber bumpers 52 extend through the cover plate as shown in Figure 2 to engage the back panel 14.

The cover plate 42 overlies the depressed portion 20 of the back panel and extends generally parallel to the panel and closely adjacent thereto. The upper portion of the back panel 14 is provided with a transversely extending depressed groove 60 and terminates in a rearwardly extending marginal flange 62 adapted to be engaged by a weather strip 64 carried by the marginal flange 12 of the luggage compartment lid 10. The lower marginal flange 12 of the luggage compartment lid overlaps the depressed groove 60 of the back panel and generally forms a continuation of the outer surface of the back panel 14 as in conventional practice.

Adjacent its upper end the cover plate 42 of the cover unit 16 is formed with a generally horizontal flange 66 extending forwardly of the vehicle into the depressed groove 60 of the back panel. At its forward extremity the flange 66 of the cover plate is provided with a return bend portion 68 and finally with a generally upwardly extending marginal flange 70. It will be noted that the marginal flange 70 of the cover plate 42 is overlapped by the lower marginal flange 12 of the luggage compartment lid when the latter is closed. Thus, as shown in Figure 2, the luggage compartment lid when closed prevents rearward swinging movement of the cover unit 16 and consequently bars access to the filler tube 22 and the filler cap 26. Thus, when the luggage compartment lid is locked as in normal car operation the cover unit 16 is likewise locked automatically and the fuel tank is adequately protected against unauthorized persons. This is readily accomplished without the necessity of providing a separate lock for the fuel tank cover unit and without in any way detracting from the appearance of the vehicle. Only the upper portion of the cover plate 42 is visible above the license plate and it can be attractively styled as shown to harmonize with the body styling.

Reference is now made to Figure 3 in which the luggage compartment lid 10 has been unlocked and swung upwardly a distance sufficient to permit the cover unit 16 to be swung rearwardly and downwardly to provide access to the filler tube. The luggage compartment lid need not be opened very far and inasmuch as most conventional lids automatically open a slight amount when unlocked it will be seen that little effort is required to open the cover unit when it is desired to fill the fuel tank. When the filling operation is completed the cover unit is readily returned to its normal position with the assistance of the coil spring 46, and the luggage compartment lid can be closed to again lock the assembly.

In the embodiment shown in Figures 1 to 4 the cover plate 42 may if desired be provided as an accessory and conveniently attached to the bracket 40 by means of the bolts 56 so that the locking feature may be available to motorists desiring it. It can also, of course, be installed as original equipment.

Figure 5:
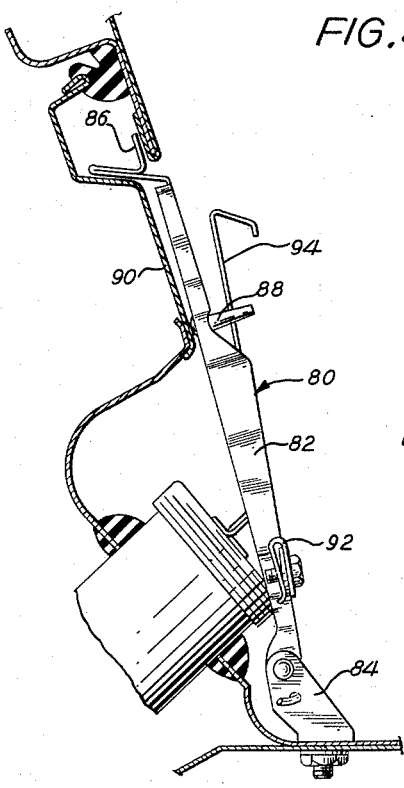
Figure 5 is an enlarged cross-sectional view of a modification.

Figure 5 shows a modification in which the cover unit 80 is formed of a single bracket 82 pivotally connected at its lower edge to the mounting bracket 84 and having an upper marginal flange 86 integrally formed therewith and similar in construction to the upper flange of the modification shown in Figures 1 to 4. The plate 82 carries the rubber bumpers 88 to space it from the back panel 90 and likewise supports the mounting lugs 92 and 94 for the license plate. It will be seen that this modification differs principally in that a unitary one-piece bracket and cover plate is provided and is designed for original equipment installation.

It will be understood that the invention is not to be limited to the exact construction shown and described, but that various changes and modifications may be made without departing from the spirit and scope of the invention, as defined in the appended claim.

What is claimed is:

In a motor vehicle body having a luggage compartment located adjacent the rearward end thereof, a forwardly extending floor panel for said compartment, a fixed transversely extending back panel extending upwardly from said floor panel adjacent the rearward edge thereof and formed with a rearwardly facing transversely extending depressed groove at its upper edge and an upper rearwardly extending marginal flange, a lid for said luggage compartment hinged at its forward edge to said vehicle body and having a rearward marginal flange overlapping the depressed groove formed at the top of said back panel, a resilient weatherstrip carried by the rearward marginal flange of said lid engaging the upper marginal flange of said back panel when the lid is closed to form a seal therebetween, said back panel having a depressed cavity located centrally of the width of the vehicle, a fuel tank filler tube extending through said back panel into said cavity, a cap for the end of said filler tube, a cover unit pivotally mounted at its lower edge on said back panel and in overlapping relationship to said cavity for swinging movement about a horizontal axis, said cover unit extending upwardly along said back panel and covering said cavity and filler tube cap and terminating in an upper marginal flange offset forwardly from the main portion of said cover unit and located in said transversely extending depressed groove in the back panel, said cover unit marginal flange being overlapped by the rearward marginal flange of the luggage compartment lid when the latter is closed to prevent swinging said cover unit rearwardly to afford access to said filler tube and cap.

References Cited in the file of this patent

UNITED STATES PATENTS

| | | |
|---|---|---|
| 2,102,110 | Burkey | Dec. 14, 1937 |
| 2,314,710 | Keller | Mar. 23, 1943 |
| 2,422,912 | Kling | June 24, 1947 |
| 2,474,974 | Fulton, Jr., et al. | July 5, 1949 |
| 2,575,211 | Flacke | Nov. 13, 1951 |
| 2,647,788 | Kaiser et al. | Aug. 4, 1953 |

FOREIGN PATENTS

| | | |
|---|---|---|
| 777,507 | France | Nov. 26, 1934 |